May 21, 1929.  F. SCHAEFER  1,714,245

GAS PURIFYING TRAP AND METHOD OF RESTORING SAME

Filed Dec. 23, 1927

INVENTOR
Frank Schaefer
BY
Chappell & Earl
ATTORNEYS

Patented May 21, 1929.

1,714,245

UNITED STATES PATENT OFFICE.

FRANK SCHAEFER, OF KALAMAZOO, MICHIGAN, ASSIGNOR OF ONE-HALF TO AMERICAN SIGNS CORPORATION, OF KALAMAZOO, MICHIGAN.

GAS-PURIFYING TRAP AND METHOD OF RESTORING SAME.

Application filed December 23, 1927. Serial No. 242,269.

In the purifying of gases, especially the so-called "rare" gases, purifying traps are employed usually consisting of a glass receptacle having circulating conduits connected thereto so that the gas being purified is circulated through the trap and the impurities are absorbed by an absorbent material, commonly charcoal. These traps are immersed in a cooling agent such, for instance, as liquid air, to increase the absorption of the impurities.

After a comparatively short time, however, the charcoal becomes loaded or loses its absorbent qualities and to restore the same it is necessary to heat the charcoal with a low pressure within the receptacle. This is impractical for the reason that when a suitable temperature is reached to secure the results sought, the receptacles are quite likely to collapse as a result of the heat and the atmospheric pressure.

The main objects of this invention are:

First, to provide an improved gas purifying trap which may be heated by means of a high frequency conduction furnace to raise the absorbent to the desired temperature without injury to the receptacle.

Second, to provide an improved method of restoring the absorbent qualities of the absorbent material of gas purifying apparatus or traps which is efficient and at the same time does not injure the trap.

Objects pertaining to details and economies of my improved apparatus and method will definitely appear from the description to follow. The invention is defined in the claims.

A structure embodying my improvements is clearly illustrated in the accompanying drawing, in which.

Figure 1:
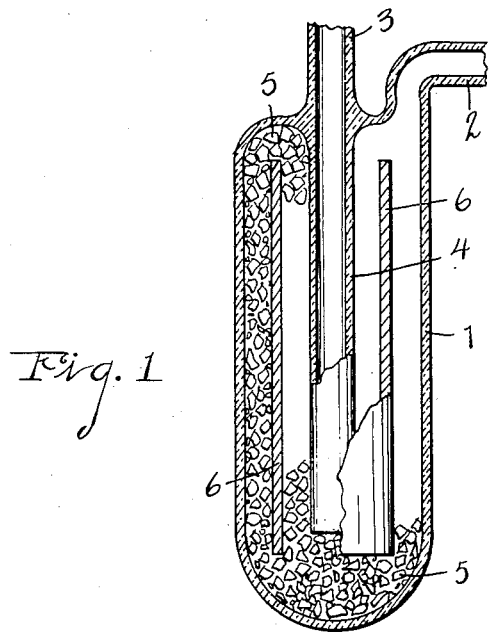
Fig. 1 is a detail vertical view of a gas purifying trap or apparatus embodying the features of my invention.
Figure 2:
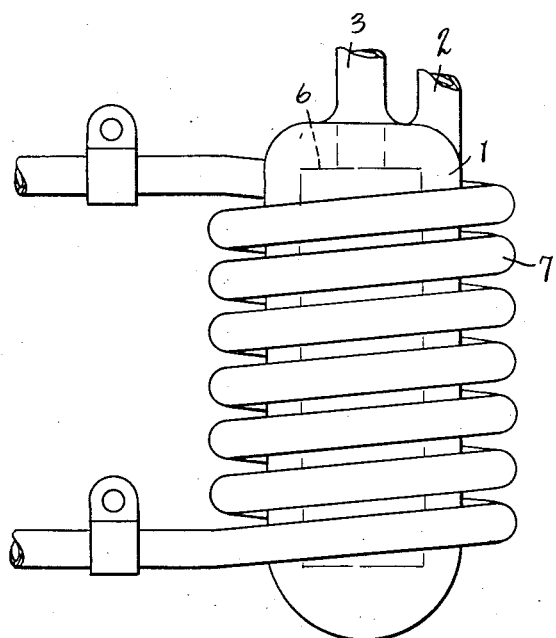
Fig. 2 is a fragmentary side elevation of my improved gas purifying trap in operative relation to a high frequency conduction furnace, the same being shown conventionally.

Referring to the drawing, my improved trap in the embodiment illustrated comprises a cylindrical closed receptacle 1 of glass having gas circulating conduits 2 and 3 connected to one end thereof. The conduit 3 has an extension 4 depending centrally within the receptacle and opening near the lower end thereof. An absorbing agent, such as charcoal in granular form, is indicated at 5.

Disposed within the receptacle and sealed therein is a metallic tube 6 which is entirely embedded within and supported by the charcoal in concentric relation to the conduit extension 4 and the wall of the receptacle.

When the absorbent material becomes ineffective or "loaded", its absorbent qualities are restored by heating as by means of a high frequency conduction furnace shown conventionally at 7. The coils of this furnace are of such diameter that the trap may be supported centrally relative thereto. The result is that the element 6 becomes red-hot, transmitting its heat to the charcoal and thereby restoring its absorbent qualities. A suitable temperature, as 600 degrees centigrade, may be attained without injury to the receptacle.

During this restoring or revivifying process a partial vacuum is maintained within the receptacle.

Where the receptacle is subjected to the required degree of heat by means of a blowtorch or electric furnace, the receptacle is likely to be destroyed. However, by means of my improved method the purifying apparatus may be rapidly and economically restored without injury thereto.

I have illustrated and described my improvements in a simple embodiment which I have found entirely satisfactory. I have not attempted to illustrate or describe certain other adaptations or modifications which I contemplate as it is believed this disclosure will enable those skilled in the art to embody or utilize my improvements as may be desired.

Having thus described my invention what I claim as new and desire to secure by Letters Patent is:

1. A gas purifying trap consisting of a cylindrical glass receptacle having a pair of circulating conduits connected to one end thereof, one of said conduits having an extension disposed centrally within said receptacle and opening adjacent the opposite end of the receptacle, an absorbent material within said receptacle, and a metallic tube of a diameter substantially larger than said conduit extension disposed concentrically relative thereto and to the wall of the receptacle with its ends spaced from the ends of the receptacle, said metallic tube being embedded within the absorbent material.

2. A gas purifying trap consisting of a cylindrical glass receptacle having circulating conduits connected thereto, an absorbent material within said receptacle, and a metallic tube disposed concentrically relative to the wall of the receptacle with its ends spaced from the ends of the receptacle, said metallic tube being embedded within the absorbent material.

3. A gas purifying trap consisting of a glass receptacle having circulating conduits connected thereto, an absorbent material within said receptacle, and a metallic element disposed within the receptacle, said metallic element being embedded within the absorbent material.

4. The method of restoring the absorbent qualities of the absorbent material of gas purifying traps comprising cylindrical glass receptacles and circulating conduits connected to one end of said receptacle, one of the conduits having an extension disposed centrally of the receptacle and opening adjacent the opposite end of the receptacle, consisting of enclosing within the receptacle a metallic tube disposed concentrically relative to the wall of the receptacle and to said circulating conduit extension with its ends in spaced relation to the ends of the receptacle, the said metallic tube being completely embedded in the absorbent material, and subjecting the gas purifying trap to a high frequency conduction furnace whereby the metallic tube becomes heated and heat is transmitted therefrom to the purifying material.

5. The method of restoring the absorbent qualities of the absorbent material of gas purifying traps comprising receptacles having circulating conduits connected thereto, one of the conduits having an extension disposed centrally of the receptacle, consisting of enclosing within the receptacle a metallic tube disposed concentrically relative to the wall of the receptacle and to said circulating conduit extension with its ends in spaced relation to the ends of the receptacle, the said metallic tube being completely embedded in the absorbent material, and subjecting the gas purifying trap to a conduction heater whereby the metallic tube becomes heated and heat is transmitted therefrom to the purifying material.

6. The method of restoring the absorbent qualities of gas purifying apparatus having glass containers and employing charcoal as an absorbing agent, consisting of embedding in the charcoal a metallic heating element, and subjecting the container to a conduction heater whereby the heating element is heated and through it the absorbent material.

7. The method of restoring the absorbent qualities of gas purifying apparatus comprising containers and an absorbing agent enclosed therein, consisting of embedding a heating element in the absorbing agent, and subjecting the container to a conduction heater whereby the heating element is heated and through it the absorbent material.

In witness whereof I have hereunto set my hand.

FRANK SCHAEFER.